(12) United States Patent
Otani et al.

(10) Patent No.: US 9,497,536 B2
(45) Date of Patent: Nov. 15, 2016

(54) ELECTRONIC DEVICE

(71) Applicant: KYOCERA Corporation, Kyoto-shi, Kyoto (JP)

(72) Inventors: Masayuki Otani, Daito (JP); Seiji Horii, Daito-shi (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/367,853

(22) PCT Filed: Dec. 3, 2012

(86) PCT No.: PCT/JP2012/081241
§ 371 (c)(1),
(2) Date: Jun. 20, 2014

(87) PCT Pub. No.: WO2013/094391
PCT Pub. Date: Jun. 27, 2013

(65) Prior Publication Data
US 2015/0326967 A1    Nov. 12, 2015

(30) Foreign Application Priority Data
Dec. 22, 2011  (JP) ................. 2011-281542

(51) Int. Cl.
*H04R 3/00*  (2006.01)
*H04B 1/38*  (2015.01)
(Continued)

(52) U.S. Cl.
CPC ............ *H04R 1/2884* (2013.01); *H04R 1/028* (2013.01); *H04R 17/02* (2013.01); *H04M 1/0202* (2013.01);
(Continued)

(58) Field of Classification Search
None
See application file for complete search history.

(56) References Cited

U.S. PATENT DOCUMENTS 6,389,297 B1    5/2002  Attimont et al.
7,400,875 B2 *  7/2008  Konno ................. H04R 1/2892
                                                            381/388
(Continued)

FOREIGN PATENT DOCUMENTS

JP    06-177809 A    6/1994
JP    2000-32106 A   1/2000
(Continued)

OTHER PUBLICATIONS

Office Action dated Nov. 25, 2014 issued in counterpart Japanese application No. 2011-281542.
(Continued)

*Primary Examiner* — Andrew L Sniezek
(74) *Attorney, Agent, or Firm* — Procopio Cory Hargreaves and Savitch LLP

(57) ABSTRACT

A cover panel is located on a front surface of an electronic device. A piezoelectric vibration element is provided on an inner main surface of the cover panel. A drive section causes the piezoelectric vibration element to vibrate based on a sound signal. The electronic device has a microphone hole located in a part other than the cover panel.

10 Claims, 10 Drawing Sheets

(51) Int. Cl.
*H04R 1/28* (2006.01)
*H04R 17/02* (2006.01)
*H04R 1/02* (2006.01)
*H04M 1/03* (2006.01)
*H04M 1/02* (2006.01)
*H04M 1/18* (2006.01)

(52) U.S. Cl.
CPC ............... *H04M 1/035* (2013.01); *H04M 1/18* (2013.01); *H04R 2499/11* (2013.01); *H04R 2499/15* (2013.01)

(56) References Cited

U.S. PATENT DOCUMENTS

| | | | |
|---|---|---|---|
| 8,884,897 B2* | 11/2014 | Sashida | G06F 3/016 |
| | | | 178/18.04 |
| 2007/0057909 A1 | 3/2007 | Schobben et al. | |
| 2008/0316115 A1 | 12/2008 | Hill et al. | |
| 2009/0045700 A1 | 2/2009 | Sasaki et al. | |
| 2010/0007564 A1 | 1/2010 | Hill et al. | |
| 2010/0117809 A1* | 5/2010 | Dai | G06F 3/041 |
| | | | 340/407.2 |
| 2011/0019123 A1 | 1/2011 | Prest et al. | |
| 2011/0019354 A1 | 1/2011 | Prest et al. | |
| 2011/0050513 A1 | 3/2011 | Hill et al. | |
| 2011/0151937 A1 | 6/2011 | Kusuda et al. | |
| 2011/0183721 A1 | 7/2011 | Hill et al. | |
| 2011/0228191 A1 | 9/2011 | Hsu et al. | |
| 2011/0242055 A1* | 10/2011 | Kim | G06F 3/042 |
| | | | 345/175 |
| 2012/0046002 A1 | 2/2012 | Hill et al. | |
| 2014/0049432 A1 | 2/2014 | Hill et al. | |
| 2015/0005036 A1* | 1/2015 | Horii | 455/566 |
| 2015/0104047 A1* | 4/2015 | Izumi | 381/162 |
| 2015/0141088 A1* | 5/2015 | Hosoi et al. | 455/575.1 |
| 2015/0256656 A1* | 9/2015 | Horii | H04R 17/00 |

FOREIGN PATENT DOCUMENTS

| | | |
|---|---|---|
| JP | P2000-13477 A | 1/2000 |
| JP | 2002-027036 A | 1/2002 |
| JP | 2002-027063 A | 1/2002 |
| JP | P2002-027063 A | 1/2002 |
| JP | 2002-232542 A | 8/2002 |
| JP | 2004-336403 A | 11/2004 |
| JP | 2005-173194 A | 6/2005 |
| JP | 2005-236352 A | 9/2005 |
| JP | 2005-348193 A | 12/2005 |
| JP | 2006-166029 A | 6/2006 |
| JP | 2007-502594 A | 2/2008 |
| JP | 2010-146002 A | 7/2010 |
| JP | 2010-162508 A | 7/2010 |
| JP | 2010-531574 A | 9/2010 |
| WO | 2007/102305 A1 | 9/2007 |
| WO | 2010-021357 A1 | 2/2010 |
| WO | 2010/101961 A2 | 9/2010 |

OTHER PUBLICATIONS

International Search Report dated Jan. 8, 2013, issued for Japanese Application No. PCT/JP2012/081241.
International Preliminary Report on Patentability dated Jun. 24, 2014 issued for International Application No. PCT/JP2012/081241.
Office Action dated Mar. 24, 2015, issued in counterpart Japanese application No. 2011-281542.
Office Action dated Jan. 5, 2016, issued in counterpart Japanese application No. 2011-281542.
Office Action dated Jan. 5, 2016, issued in counterpart Japanese application No. 2012-266418.

* cited by examiner

F I G . 1
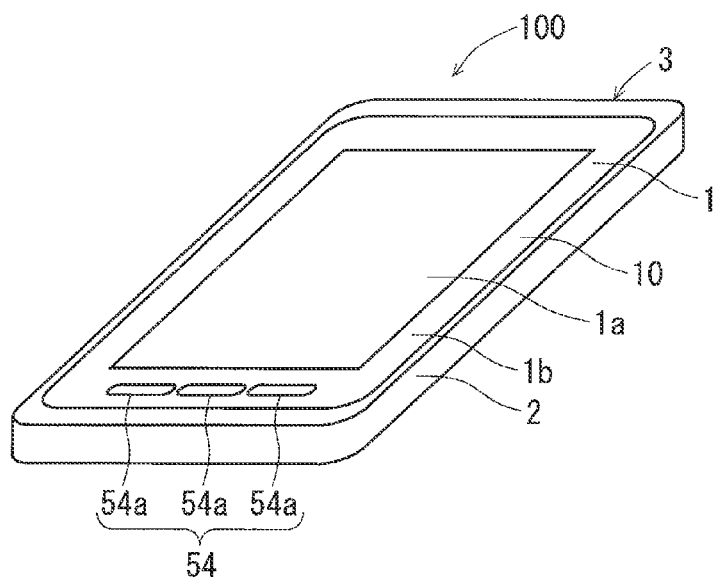
F I G . 2
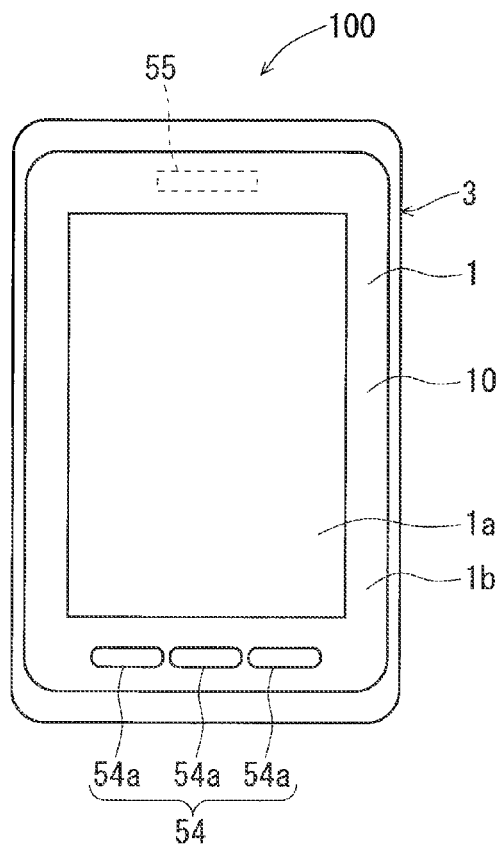

F I G. 3
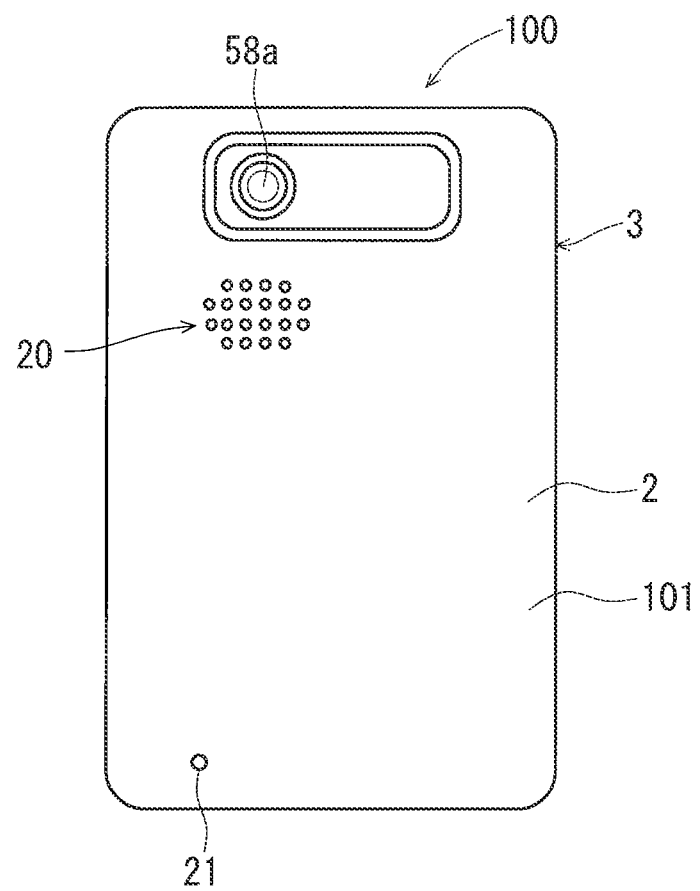

F I G . 4
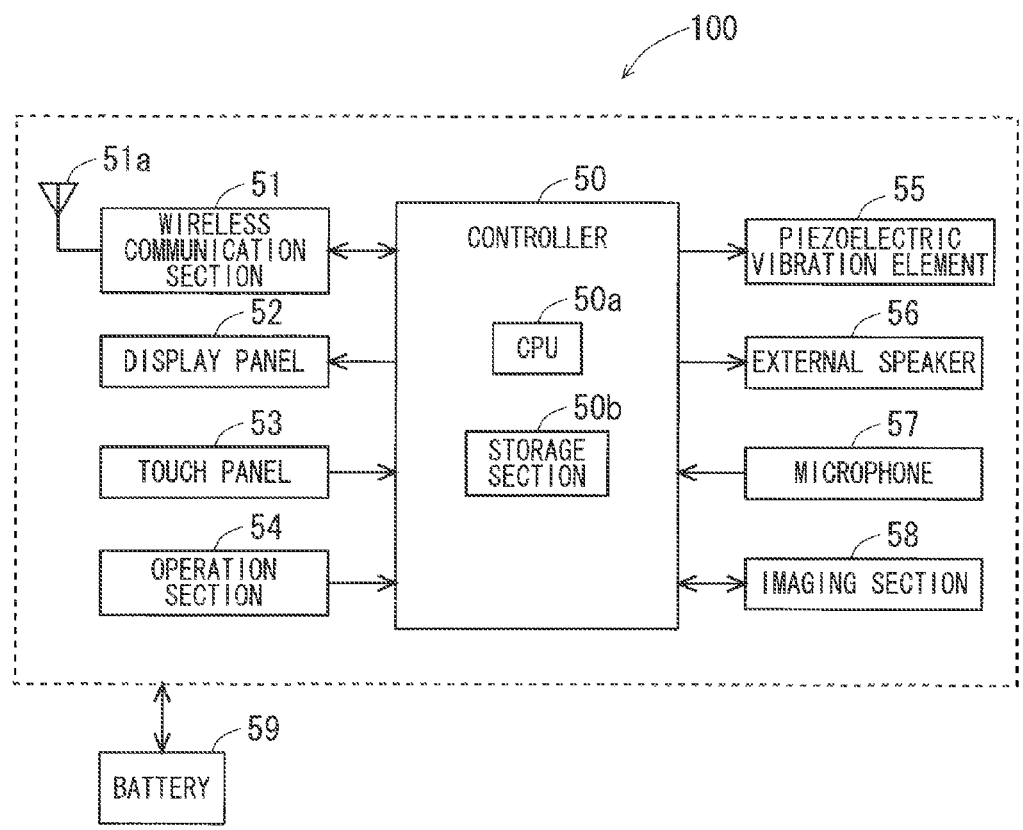
F I G . 5
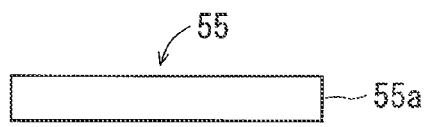
F I G . 6
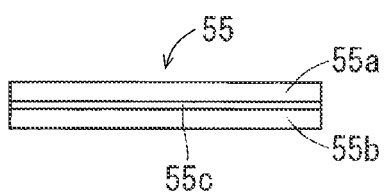

F I G . 1 1
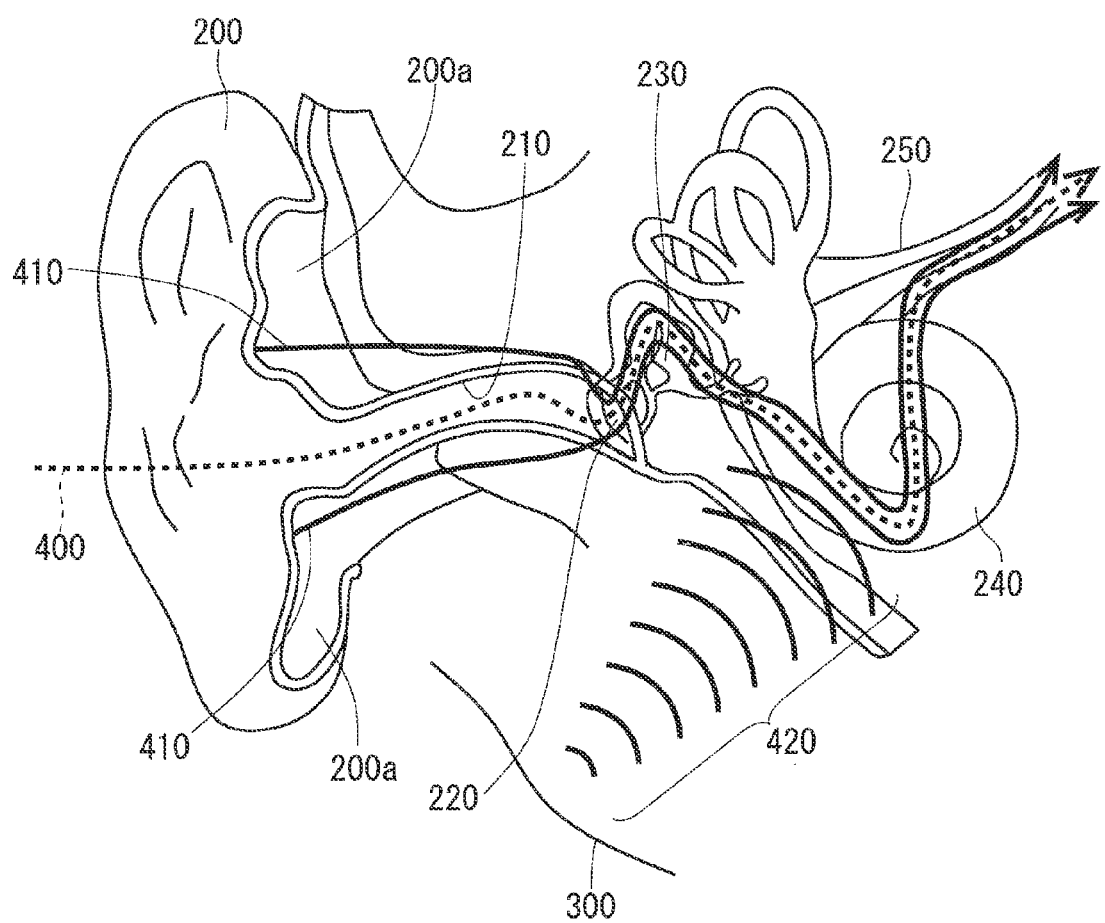

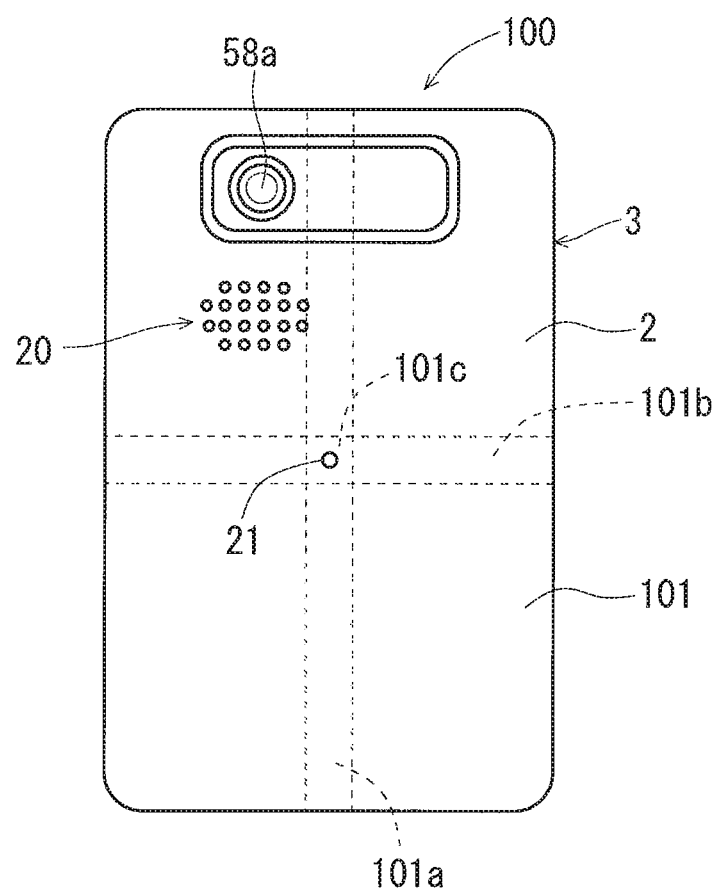
F I G . 1 7

ELECTRONIC DEVICE

TECHNICAL FIELD

The present invention relates to an electronic device that transmits sound to a user.

BACKGROUND ART

Various technologies have been conventionally proposed regarding electronic devices. For example, Patent Literature 1 describes the technology in which a piezoelectric vibration element is mounted via an elastic member onto an outer-surface of a housing of a telephone such as a mobile phone or fixed phone, and the piezoelectric vibration element is vibrated, to thereby transmit sound to a user of the telephone.

CITATION LIST

Patent Literature

Patent Literature 1: Japanese Patent Application Laid-Open No. 2005-348193

SUMMARY OF INVENTION

Problem to be Solved by the Invention

In an electronic device such as a mobile phone, an acoustic echo may be generated upon input of the sound, output from the electronic device, to a microphone provided in the electronic device.

The present invention has been made in view of the above, and therefore, an object thereof is to provide a technology capable of preventing the generation of an acoustic echo in an electronic device.

Means for Solving the Problem

An electronic device according to an aspect includes a cover panel located on a front surface of the electronic device, a piezoelectric vibration element located on an inner main surface of the cover panel, and a drive section that causes the piezoelectric vibration element to vibrate based on a sound signal. The electronic device has a microphone hole provided in a part other than the cover panel.

Effects of the Invention

The present invention can prevent the generation of an acoustic echo.

The object, features, aspects and advantages of the present invention will become more apparent from the following detailed description and the attached drawings.

BRIEF DESCRIPTION OF THE DRAWINGS

FIG. 1 is a perspective view showing an external appearance of an electronic device.

FIG. 2 is a front view showing the external appearance of the electronic device.

FIG. 3 is a rear view showing the external appearance of the electronic device.

FIG. 4 is a block diagram showing an electrical configuration of the electronic device.

FIG. 5 is a plan view showing a piezoelectric vibration element.

FIG. 6 is a side view showing the piezoelectric vibration element.

FIG. 11 is a view for describing air conducted sound and conduction sound.

FIG. 17 is a rear view showing a modification of the electronic device.

DESCRIPTION OF EMBODIMENT

<External Appearance of Electronic Device>

Figure 7:
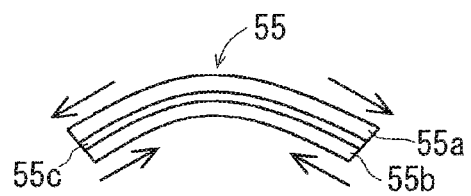
FIG. 7 is a view showing a state in which the piezoelectric vibration element flexes.

FIGS. 1 to 3 are a perspective view, a front view, and a rear view showing an external appearance of an electronic device 100 according to an embodiment, respectively. The electronic device 100 according to this embodiment is, for example, a mobile phone.

As shown in FIG. 1, the electronic device 100 includes a cover panel 1 and a case part 2. In the electronic device 100, the cover panel 1 and the case part 2 are combined to constitute a device case 3 having a plate shape substantially rectangular in plan view.

The cover panel 1 has a substantially rectangular shape in plan view. The cover panel 1 forms a part in a front surface part of the electronic device 100 other than a peripheral part thereof. The cover panel 1 is formed of, for example, a transparent glass or a transparent acrylic resin. The case part 2 forms the peripheral part of the front surface part, a side surface part, and a rear surface part of the electronic device 100. The case part 2 is formed of, for example, a polycarbonate resin.

The cover panel 1 is provided with a display part 1a on which various information such as characters, symbols, and diagrams are displayed. The display part 1a has, for example, a rectangular shape in plan view. A peripheral part 1b that surrounds the display part 1a in the cover panel 1 is black by, for example, application of a film, and serves as a non-display part on which no information is displayed. A touch panel 53, which will be described below, is attached to an inner main surface of the cover panel 1. The user can provide various instructions to the electronic device 100 by operating the display part 1a of the cover panel 1 with his/her finger or the like.

Provided inside the device case 3 is an operation section 54 including a plurality of operation buttons 54a. Each operation button 54a is a so-called "hardware key." The surface of each operation button 54a is exposed from a lower-side end portion of an outer main surface 10 of the cover panel 1. Made in the lower-side end portion of the cover panel 1 are holes for exposing the plurality of operation buttons 54a. As shown in FIG. 2, additionally, a piezoelectric vibration element 55, which will be described below, is provided inside the device case 3. Although a plurality of operation buttons 54a being "hard keys" are provided in the electronic device 100 according to this embodiment, the number of the plurality of operation buttons 54a may be appropriately changed. Alternatively, the plurality of operation buttons 54a may not be provided.

As shown in FIG. 3, speaker holes 20 and a microphone hole 21 are made in a rear surface 101 of the electronic device 100, namely, on a rear surface of the device case 3. Exposed from the rear surface 101 of the electronic device 100 is an imaging lens 58a of an imaging section 58, which will be described below.

<Electrical Configuration of Electronic Device>

FIG. 4 is a block diagram showing an electrical configuration of the electronic device 100. As shown in FIG. 4, the electronic device 100 includes a controller 50, a wireless communication section 51, a display panel 52, the touch panel 53, the operation section 54, the piezoelectric vibration element 55, an external speaker 56, a microphone 57, the imaging section 58, and a battery 59. These components of the electronic device 100 are provided in the device case 3.

The controller 50 mainly includes a CPU 50a and a storage section 50b. The controller 50 controls other components of the electronic device 100, to thereby collectively manage the operation of the electronic device 100. The storage section 50b is composed of, for example, a ROM and a RAM. Various functional blocks are formed in the controller 50 by the CPU 50a executing various programs in the storage section 50b.

The wireless communication section 51 receives, through an antenna 51a, a signal from a mobile phone different from the electronic device 100 or a communication apparatus such as a Web server connected to the Internet via a base station. The wireless communication section 51 performs amplification processing or down-conversion processing on the received signal and outputs a resultant signal to the controller 50. The controller 50 performs, modulation processing or other processing on a received signal that has been input, to thereby obtain, for example, a sound signal indicative of voice, music, or the like included in the received signal. Also, the wireless communication section 51 performs up-conversion processing and amplification processing on a transmission signal including the sound signal or the like that has been generated by the controller 50, to thereby wirelessly transmit the processed transmission signal from the antenna 51a. The transmission signal from the antenna 51a is received, via the base station, by a mobile phone different from the electronic device 100 or a communication apparatus connected to the Internet.

The display panel 52 is, for example, a liquid crystal display panel or an organic EL panel. The display panel 52 displays various information such as characters, symbols, and graphics under control of the controller 50. The information, which is to be displayed on the display panel 52, is displayed in the display part 1a of the cover panel 1 to be visible to the user of the electronic device 100.

The touch panel 53 is, for example, a projected capacitive type touch panel and detects an operation made on the display part 1a of the cover panel 1 by the user. The touch panel 53 is bonded to the inner main surface of the cover panel 1. The touch panel 53 includes two sheet-like electrode sensors disposed to face each other. The two electrode sensors are bonded with a transparent adhesive sheet.

Formed in one of the electrode sensors are a plurality of elongated X electrodes that extend along the X-axis direction (for example, a horizontal direction of the electronic device 100) and disposed to be parallel to each other. Formed in the other electrode sensor are a plurality of elongated Y electrodes that extend along the Y-axis direction (for example, a vertical direction of the electronic device 100) and are disposed to be parallel to each other. When user's finger touches the display part 1a of the cover panel 1, a capacitance between the X electrodes and the Y electrodes located below the touched portion changes, so that the touch panel 53 detects the operation performed on the display part 1a of the cover panel 1. A change in the capacitance between the X electrodes and the Y electrodes, which occurs in the touch panel 53, is transmitted to the controller 50. Then, the controller 50 identifies, based on the capacitance change, the details of the operation performed on the display part 1a of the cover panel 1, and performs the corresponding operation.

For each of the plurality of operation buttons 54a, when the user presses the operation button 54a, the operation section 54 outputs to the controller 50 an operation signal indicating that the operation button 54a has been pressed. The controller 50 identifies, based on the input operation signal, which operation button 54a of the plurality of operation buttons 54a has been operated and then performs the operation corresponding to the operation button 54a that has been operated.

The piezoelectric vibration element 55 serves to transmit received sound to the user of the electronic device 100. The piezoelectric vibration element 55 is vibrated by a drive voltage applied from the controller 50. The controller 50 generates a drive voltage based on a sound signal indicative of the received sound, and applies the drive voltage to the piezoelectric vibration element 55. The piezoelectric vibration element 55 is vibrated based on a sound signal indicative of the received sound by the controller 50, whereby the received sound is transmitted to the user of the electronic device 100. As described above, the controller 50 functions as a drive section that vibrates the piezoelectric vibration element 55 based on a sound signal. The piezoelectric vibration element 55 will be described below in detail.

The external speaker 56 converts an electrical sound signal from the controller 50 into sound and then outputs the sound. The sound output from the external speaker 56 is output to the outside of the electronic device 100 through the speaker holes 20 provided in the rear surface 101 of the electronic device 100.

The microphone 57 converts the sound input from the outside of the electronic device 100 into an electrical sound signal, and then outputs the electrical sound signal to the controller 50. The sound from the outside of the electronic device 100 is incorporated into the electronic device 100 through the microphone holes 21 provided in the rear surface 101 of the electronic device 100, and is then input to the microphone 57.

The imaging section 58 is mainly composed of the imaging lens 58a and an imaging element and captures a still image and a moving image based on the control by the controller 50.

The battery 59 outputs power for the electronic device 100. The power output from the battery 59 is supplied to electronic components of the controller 50, the wireless communication section 51, and the like included in the electronic device 100.

<Details of Piezoelectric Vibration Element>

FIGS. 5 and 6 are a top view and a side view showing the structure of the piezoelectric vibration element 55, respectively. As shown in FIGS. 5 and 6, the piezoelectric vibration element 55 is long in one direction. Specifically, the piezoelectric vibration element 55 has an elongated plate shape rectangular in plan view. The piezoelectric vibration element 55 has, for example, a bimorph structure and includes a first piezoelectric ceramic plate 55a and a second piezoelectric ceramic plate 55b bonded to each other through a shim material 55c.

In the piezoelectric vibration element 55, a positive voltage is applied to the first piezoelectric ceramic plate 55a and a negative voltage is applied to the second piezoelectric ceramic plate 55b, so that the first piezoelectric ceramic plate 55a extends along the long-side direction and the second piezoelectric ceramic plate 55b shrinks along the long-side direction. This causes, as shown in FIG. 7, the piezoelectric vibration element 55 to flex toward the first piezoelectric ceramic plate 55a in a convex manner.

In the piezoelectric vibration element 55, meanwhile, a negative voltage is applied to the first piezoelectric ceramic plate 55a and a positive voltage is applied to the second piezoelectric ceramic plate 55b, so that the first piezoelectric ceramic plate 55a shrinks along the long-side direction and the second piezoelectric ceramic plate 55b extends along the long-side direction. This causes, as shown in FIG. 8, the piezoelectric vibration element 55 to flex toward the second piezoelectric ceramic plate 55b in a convex manner.

Figure 8:
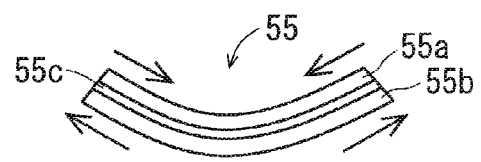
FIG. 8 is a view showing a state in which the piezoelectric vibration element flexes.

The piezoelectric vibration element 55 alternately enters the state of FIG. 7 and the state of FIG. 8, to thereby produce flexural vibrations. The controller 50 causes an AC voltage, which alternates between positive and negative voltages, to be applied between the first piezoelectric ceramic plate 55a and the second piezoelectric ceramic plate 55b, causing the piezoelectric vibration element 55 to produce flexural vibrations.

While the piezoelectric vibration element 55 shown in FIGS. 5 to 7 is provided with the structure composed of the first piezoelectric ceramic plate 55a and the second piezoelectric ceramic plate 55b that are bonded with the shim material 55c sandwiched therebetween, a plurality of the above-mentioned structures may be laminated.

<Position at which Piezoelectric Vibration Element is Disposed>

Figure 9:
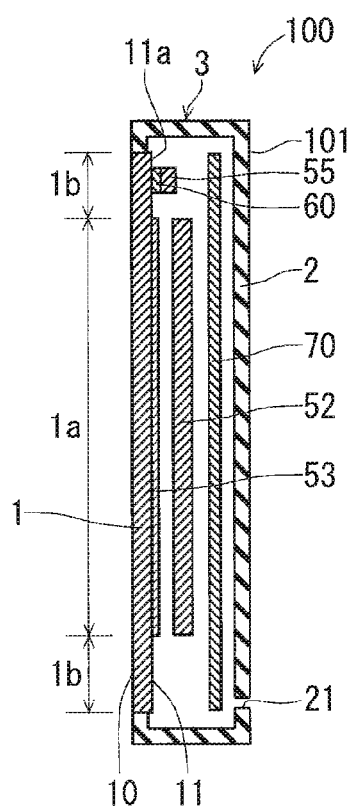
FIG. 9 is a cross-sectional view showing the electronic device.
Figure 10:
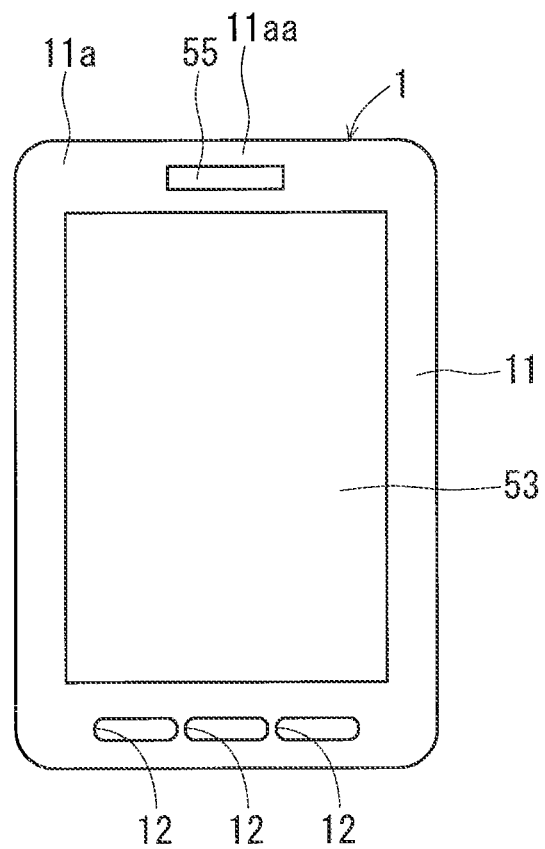
FIG. 10 is a plan view showing a cover panel.

FIG. 9 shows the cross-sectional structure in the vertical direction (long-side direction) of the electronic device 100. FIG. 10 is a plan view of the cover panel 1 when viewed from its inner main surface 11 side.

As shown in FIGS. 9 and 10, the touch panel 53 is bonded to the inner main surface 11 of the cover panel 1 so as to face the display part 1a of the cover panel 1. The display panel 52 being a display member is disposed to face the cover panel 1 and the touch panel 53. The touch panel 53 is thus located between the cover panel 1 and the display panel 52. The part of the cover panel 1, which faces the display panel 52, serves as the display part 1a.

Provided inside the device case 3 is a printed circuit board 70 on which various components such as the CPU 50a and the microphone 57 are mounted. The printed circuit board 70 is disposed to face the display panel 52 on the side closer to the rear surface 101 of the electronic device 100 than the display panel 52. As shown in FIG. 10, a plurality of holes 12 for respectively exposing the plurality of operation buttons 54a are made in the lower-side end portion of the cover panel 1.

The piezoelectric vibration element 55 is bonded to the inner main surface 11 of the cover panel 1 with an adhesive 60 such as a double-sided tape. The piezoelectric vibration element 55 is disposed, on the inner main surface 11 of the cover panel 1, at a position at which the piezoelectric vibration element 55 does not overlap the display panel 52 and the touch panel 53 in plan view of the cover panel 1 viewed from the inner main surface 11 side. In other words, when the cover panel 1 is viewed from the inner main surface 11 side in the thickness direction of the cover panel 1, the piezoelectric vibration element 55 is disposed, on the inner main surface 11, at a position at which the piezoelectric vibration element 55 does not overlap the display panel 52 and the touch panel 53. Therefore, the touch panel 53 and the display panel 52 are not located between the cover panel 1 and the piezoelectric vibration element 55.

The piezoelectric vibration element 55 is provided on an upper-side end portion 11a of the inner main surface 11 of the cover panel 1. Specifically, as shown in FIG. 10, the piezoelectric vibration element 55 is provided on a center portion 11aa in the horizontal direction (short-side direction vertical to the long-side direction) at the upper-side end portion 11a of the inner main surface 11 of the cover panel 1.

The piezoelectric vibration element 55 is disposed such that its long-side direction coincides with the horizontal direction of the cover panel 1. The piezoelectric vibration element 55 is disposed at the center portion 11aa of the upper-side end portion 11a of the inner main surface 11 of the cover panel 1 such that the center in the long-side direction thereof coincides with the center in the horizontal direction at the upper-side end portion 11a.

A As shown in FIGS. 7 and 8 described above, the piezoelectric vibration element 55 that produces flexural vibrations has the largest displacement amount at the center in the long-side direction thereof. Thus, the piezoelectric vibration element 55 is disposed at the upper-side end portion 11a of the inner main surface 11 of the cover panel 1 such that the center in the long-side direction thereof coincides with the center in the horizontal direction at the upper-side end portion 11a, whereby the portion of the piezoelectric vibration element 55, at which a displacement amount of flexural vibrations is maximized, coincides with the center in the horizontal direction in the upper-side end portion 11a of the inner main surface 11 of the cover panel 1.

<Generation of Received Sound Through Vibrations of Piezoelectric Vibration Element>

In this embodiment, the piezoelectric vibration element 55 causes the cover panel 1 to vibrate, so that air conducted sound and conduction sound are transmitted to the user from the cover panel 1. In other words, the vibrations of the piezoelectric vibration element 55 itself are transmitted to the cover panel 1, allowing the transmission of air conducted sound and conduction sound to the user from the cover panel 1.

Herein, air-conducted sound is the sound recognized by the human brain when sound wave (air vibrations), which has entered the external auditory meatus (so-called "earhole"), causes the eardrum to vibrate. Meanwhile, conduction sound is the sound recognized by the human brain when the auricle is caused to vibrate and vibrations of the auricle are transmitted to the eardrum, which causes the eardrum to vibrate. Air conducted sound and conduction sound will be described below in detail.

FIG. 11 is a view for describing air conducted sound and conduction sound. FIG. 11 shows the structure of the ear of the user of the electronic device 100. In FIG. 11, a wavy line 400 indicates a conductive path of a sound signal (sound information) when air-conducted sound is recognized by the brain, and a solid line 410 indicates a conductive path of a sound signal when conduction sound is recognized by the brain.

When the piezoelectric vibration element 55 mounted on the cover panel 1 is vibrated based on an electrical sound signal indicative of received sound, the cover panel 1 vibrates, whereby a sound wave is output from the cover panel 1. When the user has the electronic device 100 in his/her hand and brings the cover panel 1 of the electronic device 100 near an auricle 200 of the user or puts the cover panel 1 of the electronic device 100 to the auricle 200 of the user, the sound wave output from the cover panel 1 enters an external auditory meatus 210. The sound wave from the cover panel 1 travels through the external auditory meatus 210 and causes an eardrum 220 to vibrate. The vibrations of the eardrum 220 are transmitted to an auditory ossicle 230, causing the auditory ossicle 230 to vibrate. Then, the vibrations of the auditory ossicle 230 are transmitted to a cochlea 240 and are then converted into an electrical signal in the cochlea 240. The electrical signal is transmitted to the brain through an auditory nerve 250, so that the brain recognizes received sound. In this manner, air conducted sound is transmitted from the cover panel 1 to the user.

When the user has the electronic device 100 in his/her hand and holds the cover panel 1 of the electronic device 100 to the auricle 200 of the user, the auricle 200 is vibrated by the cover panel 1 vibrated by the piezoelectric vibration element 55. The vibrations of the auricle 200 are transmitted to the eardrum 220, causing the eardrum 220 to vibrate. The vibrations of the eardrum 220 are transmitted to the auditory ossicle 230, causing the auditory ossicle 230 to vibrate. The vibrations of the auditory ossicle 230 are then transmitted to the cochlea 240 and are converted into an electrical signal by the cochlea 240. The electrical signal is transmitted to the brain through the auditory nerve 250, whereby the brain recognizes received sound. In this manner, conduction sound is transmitted from the cover panel 1 to the user. FIG. 11 also shows an auricular cartilage 200a inside the auricle 200.

The conduction sound described herein differs from bone-conducted sound (also referred to as "bone conduction sound"). Bone-conducted sound is the sound recognized by the human brain when the skull vibrates and the vibrations of the skull directly stimulate the inner ear such as the cochlea. In FIG. 11, a plurality of arcs 420 indicate, in a case where, for example, a mandibular bone 300 is vibrated, a transmission path of a sound signal when bone conduction sound is recognized by the brain.

As described above, in the electronic device 100 according to this embodiment, the piezoelectric vibration element 55 appropriately vibrates the cover panel 1 on the front surface, so that air conducted sound and conduction sound can be transmitted from the cover panel 1 to the user of the electronic device 100. The structure of the piezoelectric vibration element 55 according to this embodiment is contrived to appropriately transmit air conducted sound and conduction sound to the user. Various advantages can be achieved by configuring the electronic device 100 to transmit air conducted sound and conduction sound to the user.

For example, the user can hear sound by bringing the cover panel 1 to his/her ear, and thus can have a telephone conversation without much consideration of the position at which the electronic device 100 is brought to his/her ear.

If ambient noise is large, the user can make it difficult to hear ambient noise by putting his/her ear strongly to the cover panel 1 while turning up the volume of the conduction sound. This enables the user to appropriately have a telephone conversation if ambient noise is large.

Even while wearing earplugs or earphones in his/her ears, the user can recognize the received sound from the electronic device 100 by holding the cover panel 1 to his/her ear (more specifically, auricle). Alternatively, even while wearing headphones in his/her ears, the user can recognize the received sound from the electronic device 100 by holding the cover panel 1 to the headphone.

While a clearance is provided between the touch panel 53 and the display panel 52 in the above-mentioned example as shown in FIG. 9, the touch panel 53 and the display panel 52 may be brought into contact. A clearance, provided between the touch panel 53 and the display panel 52 as in this embodiment, can prevent such a situation that the cover panel 1 flexes toward the display panel 52 by being pressed by the user with his/her finger, and the cover panel 1 hits the display panel 52 (more accurately, the touch panel 53 hits the display panel 52) to disturb the display of the display panel 52.

Figure 12:
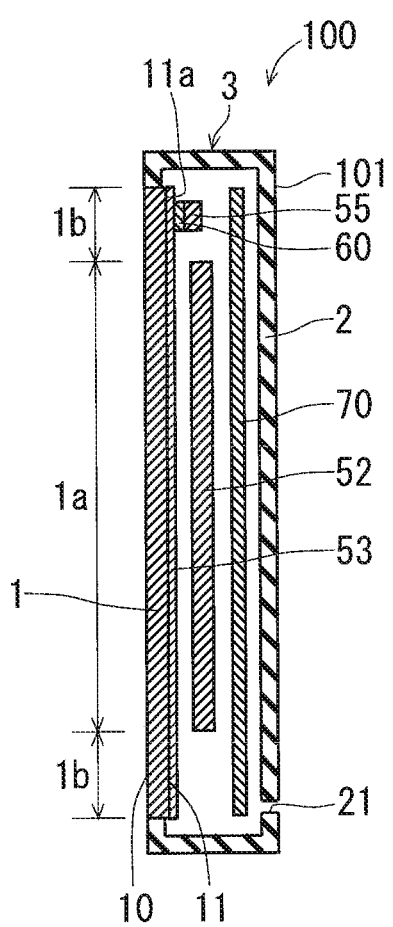
FIG. 12 is a cross-sectional view showing a modification of the electronic device.

As shown in FIG. 12, in a case where the touch panel 53 is located over the entire inner main surface 11 of the cover panel 1, the piezoelectric vibration element 55 may be disposed on the inner main surface 11 of the cover panel 1 through the touch panel 53.

With no touch panel 53 provided to the electronic device 100, an input may be made to the electronic device 100 with hard keys alone. In this case, hard keys other than the operation buttons 54a may be further provided on, for example, the front surface of the electronic device 100. In this case, the cover panel 1 and the display panel 52 may be disposed to face each other with a clearance therebetween or may be disposed to face each other while being in contact with each other.

In the electronic device 100 according to this embodiment, as described above, the piezoelectric vibration element 55 is disposed, on the inner main surface 11 of the cover panel 1, at a position at which the piezoelectric vibration element 55 does not overlap the display panel 52 in plan view of the cover panel 1 viewed from the inner main surface 11 side, so that the display panel 52 is not located between the cover panel 1 and the piezoelectric vibration element 55. This allows the vibrations of the piezoelectric vibration element 55 to be easily transmitted to the cover panel 1. Therefore, sound can be appropriately transmitted from the cover panel 1 to the user.

In a case where the touch panel 53 is located between the cover panel 1 and the display panel 52 as in this embodiment, the part of the cover panel 1 that faces the display panel 52, namely, the display part 1a is frequently pressed by the user with his/her finger or the like. The cover panel 1 may flex when the cover panel 1 is pressed, and thus, the piezoelectric vibration element 55 may break in a case where the piezoelectric vibration element 55 is disposed at the part that is highly likely to be pressed by the user in the cover panel 1. In this embodiment, the piezoelectric vibration element 55 is disposed, on the inner main surface 11 of the cover panel 1, at the position at which the piezoelectric vibration element 55 does not overlap the display panel 52 in plan view of the cover panel 1 viewed from the inner main surface 11 side, that is, is disposed at the part other than the display part 1a in the cover panel 1. Thus, the piezoelectric vibration element 55 can be disposed at a part that is less likely to be pressed in the cover panel 1. This prevents the cover panel 1 from being pressed to break the piezoelectric vibration element 55.

In a case where the touch panel 53 is located between the cover panel 1 and the display panel 52 as in this embodiment, as shown in FIG. 9 described above, the piezoelectric vibration element 55 can be disposed, on the inner main surface 11 of the cover panel 1, at the position at which the piezoelectric vibration element 55 does not overlap the display panel 52 and the touch panel 53 in plan view of the cover panel 1 viewed from the inner main surface 11 side, preventing not only the display panel 52 but also the touch panel 53 from being located between the cover panel 1 and the piezoelectric vibration element 55. Thus, the vibrations of the piezoelectric vibration element 55 can be easily transmitted to the cover panel 1, leading to more appropriate sound transmission from the cover panel 1 to the user.

When the user uses the electronic device 100 in a telephone conversation, the user is highly likely to put his/her ear to the upper-side end portion of the front surface of the electronic device 100. As in this embodiment, thus, the piezoelectric vibration element 55 is provided on the upper-side end portion of the inner main surface 11 of the cover panel 1 to increase vibrations at the upper-side end portion of the front surface of the cover panel 1, allowing conduction sound to be easily transmitted to the user. In particular, the user is highly likely to put his/her ear to the center in the horizontal direction of the upper-side end portion of the front surface of the electronic device 100. For this reason, conduction sound can be more easily transmitted to the user by providing the piezoelectric vibration element 55 on the center portion in the horizontal direction at the upper-side end portion of the inner main surface 11 of the cover panel 1 to increase the vibrations in the center portion in the horizontal direction at the upper-side end portion of the front surface of the cover panel 1. If the piezoelectric vibration element 55 produces flexural vibrations as in this embodiment, vibrations at the center in the horizontal direction at the upper-side end portion of the front surface of the cover panel 1 by causing the portion (the center in the long-side direction of the piezoelectric vibration element 55) at which the displacement amount of flexural vibrations is maximized in the piezoelectric vibration element 55 to coincide with the center in the horizontal direction at the upper-side end portion of the inner main surface 11 of the cover panel 1. This further facilitates the transmission of conduction sound to the user.

In a case where the piezoelectric vibration element 55 has a shape longer in one direction as in this embodiment, as shown in FIGS. 2 and 10 described above, the piezoelectric vibration element 55 is desirably disposed such that its long-side direction coincides with the horizontal direction of the cover panel 1. In a case where the piezoelectric vibration element 55 is disposed such that its long-side direction coincides with the vertical direction of the cover panel 1, the position of the display panel 52 needs to be lowered to prevent the display panel 52 from overlapping the piezoelectric vibration element 55. This needs to increase the size of the electronic device 100 in the vertical direction or reduce the size of the display part 1a of the cover panel 1 in the vertical direction. The piezoelectric vibration element 55 is disposed such that its long-side direction coincides with the horizontal direction of the cover panel 1 as in this embodiment, resulting in an increase in the size of the display part 1a of the cover panel 1 in the vertical direction while regulating the length in the vertical direction of the electronic device 100.

<Earpiece Hole (Receiver Hole)>

In the electronic device such as a mobile phone, an earpiece hole may be made in the cover panel 1 on the front surface to extract the sound output from the receiver (reception speaker), which is provided inside the electronic device, to the outside of the electronic device.

In the electronic device 100 according to this embodiment, an earpiece hole (receiver hole) is not made in the cover panel 1 from which sound is output. In other words, an earpiece hole is not provided in the front surface of the electronic device 100. This eliminates the process of making an earpiece hole in the cover panel 1. This reduces the manufacturing cost of the electronic device 100, leading to a reduction in the cost of the electronic device 100. Particularly for the cover panel 1 made of glass, the process of forming a hole in the cover panel 1 is difficult, and thus, the manufacturing cost of the electronic device 100 can be reduced further by making no earpiece hole in the cover panel 1. Also, making no earpiece hole in the cover panel 1 improves the strength of the cover panel 1. Further, making no earpiece hole in the cover panel 1 leads to improved design flexibility of the front surface of the cover panel 1. Particularly in a case where the cover panel 1 accounts for most of the front surface of the electronic device 100 as in this embodiment, forming no earpiece hole in the cover panel 1 is highly effective from the design perspective. This embodiment is free from such a problem that water, dust, or the like enters the electronic device 100 through an earpiece hole because the front surface of the electronic device 100 has no earpiece hole. This eliminates the need for the electronic device 100 to have the waterproof structure or dustproof structure against this problem, resulting in a further cost reduction of the electronic device 100.

In this embodiment, vibrations of the cover panel 1 generate received sound, whereby the received sound can be transmitted to the user if the electronic device 100 has no earpiece hole.

While the holes 12 for exposing the operation buttons 54a are formed in the cover panel 1 according to this embodiment, holes for exposing the operation buttons 54a may be formed in the case part 2 and the holes 12 may not be provided in the cover panel 1. Or, the operation buttons 54a may not be provided and the holes 12 may not be provided in the cover panel 1. Thus, no holes are made in the cover panel 1, resulting in a further cost reduction of the electronic device 100 and further improved design flexibility of the front surface of the cover panel 1.

<Position of Microphone Hole>

An electronic device such as a mobile phone may generate an acoustic echo upon input of the sound (in a case of a mobile phone, received sound) generated by the electronic device to a microphone. In the electronic device 100, if the microphone hole 21 is made in the cover panel 1, the microphone hole 21 is provided in the part from which sound is output, allowing sound to easily enter the microphone hole 21. This allows sound to be easily input to the microphone 57, and thus, an acoustic echo is generated easily.

In this embodiment, as shown in FIG. 3, the microphone hole 21 is provided at the part other than the cover panel 1 from which sound is output, causing the position of the part from which sound is output to be apart from the position of the microphone hole 21 in the electronic device 100. This prevents an input of the received sound output from the cover panel 1 to the microphone hole 21. As a result, the generation of an acoustic echo can be prevented.

Figure 13:
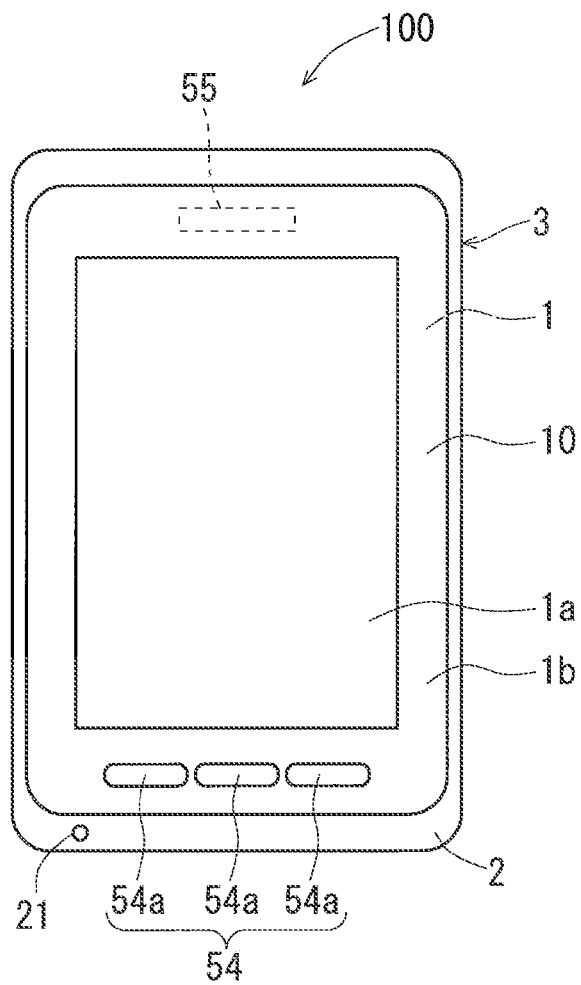
FIG. 13 is a front view showing a modification of the electronic device.
Figure 14:
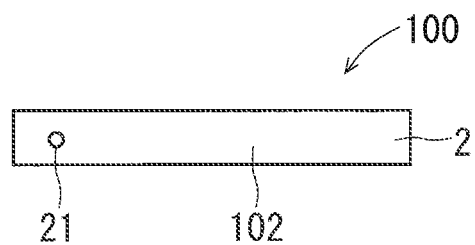
FIG. 14 is a side view showing a modification of the electronic device.

While the microphone hole 21 is provided in the rear surface 101 of the electronic device 100 in this embodiment, the microphone hole 21 may be provided in the front surface or side surface of the electronic device 100 as long as it is not located in the cover panel 1. FIG. 13 is a front view showing the electronic device 100 in a case where the microphone hole 21 is provided in the case part 2 of the front surface of the electronic device 100. FIG. 14 is a side view showing the electronic device 100 in a case where the microphone hole 21 is provided in the case part 2 of the side surface of the electronic device 100. In the example of FIG. 14, the microphone hole 21 is provided in a lower side surface 102 (undersurface) of the side surfaces of the electronic device 100.

The sound output from the cover panel 1 on the front surface of the electronic device 100 is difficult to reach the rear surface 101 of the electronic device 100. For this reason, the generation of an acoustic echo can be further prevented by making the microphone hole 21 in the rear surface 101 of the electronic device 100 as in this embodiment.

Figure 15:
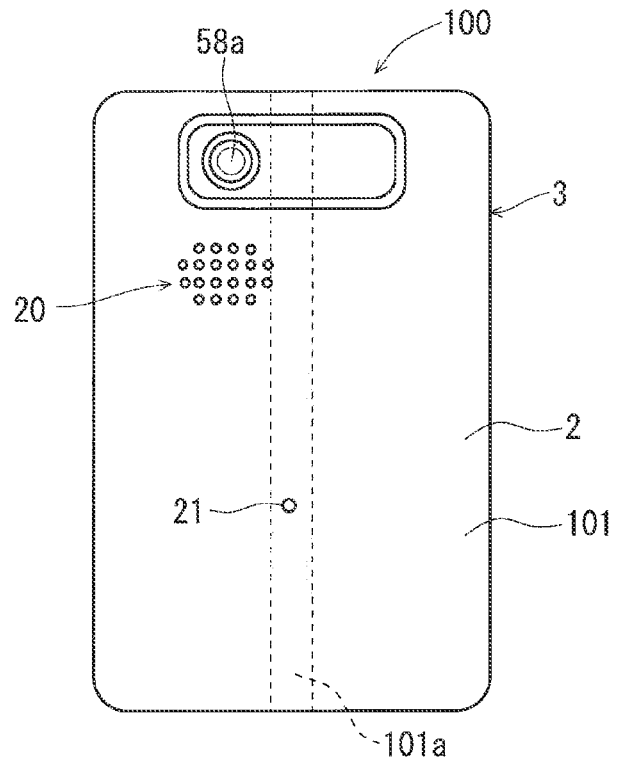
FIG. 15 is a rear view showing a modification of the electronic device.

As shown in FIG. 15, the microphone hole 21 may be formed in a center area 101a extending along the vertical direction in the rear surface 101 of the electronic device 100. As a result, the sound reaching the rear surface 101 from the horizontal direction of the electronic device 100 is difficult to enter the microphone hole 21, further reducing the generation of an acoustic echo. In a case where the user has the electronic device 100 in his/her hand and puts his/her ear to the cover panel 1 to make a telephone conversation, the microphone hole 21 provided in the center area 101a is difficult to be blocked with the user's palm. This allows the voice (transmission sound) given by the user to be easily input to the microphone 57.

Figure 16:
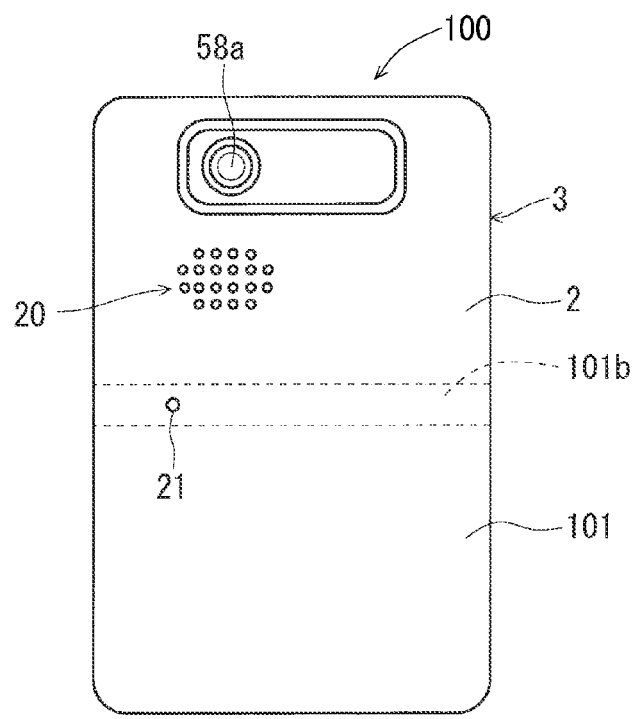
FIG. 16 is a rear view showing a modification of the electronic device.

As shown in FIG. 16, the microphone hole 21 may be formed in a center area 101b extending along the horizontal direction in the rear surface 101 of the electronic device 100. This causes the sound reaching the rear surface 101 from the vertical direction of the electronic device 100 to be difficult to enter the microphone hole 21, further preventing the generation of an acoustic echo. In a case where the user has the electronic device 100 in his/her hand and puts his/her ear to the cover panel 1 to make a telephone conversation, the microphone hole 21 provided in the center area 101b is difficult to be blocked with user's palm. This allows the voice given by the user to be easily input to the microphone 57.

As shown in FIG. 17, the microphone hole 21 may be made in a center area 101c (part at which the center area 101a extending along the vertical direction and the center area 101b extending along the horizontal direction overlap) of the rear surface 101 of the electronic device 100. Thus, the sound reaching the rear surface 101 of the electronic device 100 is more difficult to enter the microphone hole 21. This further prevents the generation of an acoustic echo.

While the example above has described the exemplary case in which the present invention is applied to a mobile phone, the present invention is also applicable to electronic devices other than a mobile phone. For example, the present invention is applicable to a game console, a notebook personal computer, a portable navigation system, and the like.

The present invention has been described in detail, but the above-mentioned description is illustrative in all aspects and the present invention is not intended to be limited thereto. Various modifications not exemplified are construed to be made without departing from the scope of the present invention.

DESCRIPTION OF REFERENCE SIGNS 1 cover panel
11 inner main surface
21 microphone hole
50 controller
53 touch panel
55 piezoelectric vibration element
100 electronic device

The invention claimed is:

1. An electronic device, comprising:
a cover panel located on a front surface of said electronic device;
a touch panel located on an inner main surface of said cover panel;
a piezoelectric vibration element located on said inner main surface of said cover panel at a position that does not overlap said touch panel in plan view;
a display located at a position that overlaps said touch panel and does not overlap said piezoelectric vibration element in plan view; and
a drive section that causes said piezoelectric vibration element to vibrate based on a sound signal,
wherein said electronic device includes a microphone hole located in a part other than said cover panel, and
wherein said piezoelectric vibration element causes said cover panel to vibrate so that air conducted sound and auricle conducted sound are transmitted from said cover panel to a user.

2. The electronic device according to claim 1, wherein said microphone hole is provided on a rear surface of said electronic device.

3. The electronic device according to claim 2, wherein said microphone hole is provided in a center area extending along a vertical direction and a center area extending along a horizontal direction of the rear surface of said electronic device.

4. The electronic device according to claim 2, wherein said microphone hole is provided in a center area extending along a vertical direction of the rear surface of said electronic device.

5. The electronic device according to claim 1, wherein said front surface of said electronic device does not comprise any holes.

6. The electronic device according to claim 1, wherein said microphone hole is provided on a side surface of said electronic device.

7. The electronic device according to claim 6, wherein said microphone hole is provided on a lower side surface of said electronic device.

8. The electronic device according to claim 1, wherein said piezoelectric vibration element is positioned on an upper portion of said inner main surface of said cover panel, above said touch panel, in plan view.

9. The electronic device according to claim 8, wherein said piezoelectric vibration element is centered along a horizontal direction of said upper portion of said inner main surface of said cover panel.

10. The electronic device according to claim 9, wherein a longitudinal direction of said piezoelectric vibration element coincides with the horizontal direction of said upper portion of said inner main surface of said cover panel.

* * * * *